UNITED STATES PATENT OFFICE.

JOHN H. WALSH, OF BOSTON, MASSACHUSETTS.

COMPOSITION FOR PIPES.

SPECIFICATION forming part of Letters Patent No. 400,527, dated April 2, 1889.

Application filed December 2, 1887. Serial No. 256,732. (No specimens.)

*To all whom it may concern:*

Be it known that I, JOHN H. WALSH, of Boston, in the county of Suffolk and State of Massachusetts, have invented certain new and useful Improvements in the Process of Making and Hardening Cement Pipes, of which the following is a specification.

This invention pertains to certain new and useful improvements in compositions for pipes, having for its object the production of a pipe of very superior and lasting qualities for use particularly as a conductor for underground wires.

Another object is to produce a pipe forming a perfect non-conductor of electricity.

In carrying into effect my invention I take the following ingredients, viz: sand, five parts; Portland cement, two and one-half parts; Rosendale cement, one and one-fourth part; sulphur, one and one-fourth part. These ingredients are mixed intimately with a small quantity of water, say twelve quarts to a two-hundred-and-eighty-pound pipe, and pressed into iron molds by a stamp striking fifteen hundred pounds to the square inch. The sulphur is used to make the pipes more perfect non-conductors of electricity.

A limestone that contains more than ten per cent. of silica or clay, when burned in a kiln in a manner similar to which lime is burned, possesses the property of "setting" or becoming hard and stone-like when made into mortar by moistening with water and allowing to stand for some time. Limestone that possesses this property is called "cement." As there is but little limestone that contains enough silica to cause it to set, most cement is made artificially by mixing ground limestone and clay in the right proportions, and burning the mixture in a common lime-kiln, which produces a compound capable of hardening upon moistening it with water and allowing it to remain undisturbed for several days. Now the setting of cement is due to chemical and physical changes. In order to better understand these changes it will be well to look at the composition of cement. Portland cement contains—

| | Per cent. |
|---|---|
| Lime | 59.06 |
| Silicic acid | 24.07 |
| Alumina | 6.92 |
| Oxide of iron | 3.41 |
| Magnesia | 0.82 |
| Potash | 0.73 |
| Soda | 0.87 |
| Sulphate of lime | 2.85 |
| Clay | |
| Sand | 1.47 |

It will be seen that cement contains a large amount of lime, which is, chemically speaking, an oxide of calcium, and when this substance is moistened and exposed to the air it slowly absorbs carbon dioxide and is converted into carbonate of calcium. Carbonate of calcium is also formed in another way: when water is added to cement some of the oxide of calcium is dissolved, forming hydrate of calcium, and the carbon dioxide of the air acting on the hydrate of calcium forms carbonate of calcium. Cement also contains the alkaline silicates of sodium and potassium, and these acting on the lime form silicates of calcium. Another change is produced in the cement by the crystallizing of the hydrate of calcium. As the water holding hydrate of calcium in solution evaporates spontaneously, the hydrate of calcium is deposited in crystals. The changes above enumerated cause the cement to "set;" but when merely exposed to the air the changes are very slow and imperfect, and for this reason after molding my improved pipe I subject the same to treatment now to be described. The pipe is now removed from the mold and placed in a closed chamber, where it is treated with a water-saturated mixture of carbon dioxide and air for about seven days, when it is perfectly solidified and ready for use. It has been found convenient to prepare the carbon dioxide by the combustion of charcoal in a tight stove, the air for the combustion being furnished by a pipe which extends into the air outside of the building. The carbon-dioxide gas mixed with air is passed through a cooler, in which the mixed air and gas is saturated with moisture, and from which it is conducted into the closed chamber containing the pipes. It is found needful to cool the gas, as when it is passed into the chamber hot it causes the pipes to crackle. The action in this closed chamber is similar to that described above as taking place in the air. The carbonate, hydrate, and silicate of calcium are formed, and thus the pipes are rapidly and perfectly hardened. The moisture with which the air and gas are charged comes in contact with all the surfaces of the pipes to be treated; and, dissolving some of the calcium oxide, forms calcium hydrate. The calcium hydrate is in turn acted on by the carbon dioxide, forming calcium carbonate.

I do not limit myself to the proportions herein specified, but may vary the same without departing from the spirit of my invention.

I claim—

The herein-described improved composition for pipe, composed of sand, Portland cement, Rosendale cement, and sulphur, as stated.

In testimony whereof I have signed my name to this specification, in the presence of two subscribing witnesses, this 29th day of November 1887.

JOHN H. WALSH.

Witnesses:
ARTHUR W. CROSSLEY,
A. D. HARRISON.